(12) United States Patent
Remy

(10) Patent No.: US 12,196,132 B1
(45) Date of Patent: Jan. 14, 2025

(54) SYSTEM AND METHOD FOR PRELOADING A BEARING

(71) Applicant: PRATT & WHITNEY CANADA CORP., Longueuil (CA)

(72) Inventor: Patrice Remy, St-Hubert (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/392,921

(22) Filed: Dec. 21, 2023

(51) Int. Cl.
F02C 7/06 (2006.01)

(52) U.S. Cl.
CPC .......... *F02C 7/06* (2013.01); *F05D 2220/323* (2013.01); *F05D 2240/52* (2013.01); *F05D 2260/15* (2013.01); *F05D 2260/40311* (2013.01)

(58) Field of Classification Search
CPC ...... F02C 7/06; F02C 7/20; F02C 7/28; F05D 2220/323; F05D 2240/52; F05D 2260/15; F05D 2260/40311
See application file for complete search history.

(56) References Cited

U.S. PATENT DOCUMENTS

| | | | |
|---|---|---|---|
| 4,005,575 A * | 2/1977 | Scott | F02C 9/18 415/61 |
| 5,862,666 A | 1/1999 | Liu | |
| 8,083,472 B2 | 12/2011 | Maguire | |
| 8,182,201 B2 | 5/2012 | Alecu et al. | |
| 8,584,514 B2 | 11/2013 | Tecza et al. | |
| 2007/0122265 A1 | 5/2007 | Ansari et al. | |
| 2008/0022653 A1* | 1/2008 | Schilling | F02K 3/06 60/226.1 |

* cited by examiner

*Primary Examiner* — Steven M Sutherland
(74) *Attorney, Agent, or Firm* — NORTON ROSE FULBRIGHT CANADA LLP

(57) ABSTRACT

An aircraft engine comprises a rotating component and a reduction gearbox connected thereto. A rotating shaft extending along an axis is coupled to the gearbox. A thrust bearing disposed in a bearing housing extends around the shaft and supports the shaft. The bearing housing defines a piston chamber. A piston therein axially secured to the shaft and in sealing engagement with the bearing housing divides the chamber into two cavities. The piston has opposite first and second axial faces exposed to respective cavities. The first face faces axially away from the thrust bearing. A compressed air source is in fluid communication with the first cavity with air at a first pressure exerting a first force against the first axial face. The second cavity is at a second pressure exerting a second force against the second axial face. The first force is greater than the second.

16 Claims, 5 Drawing Sheets

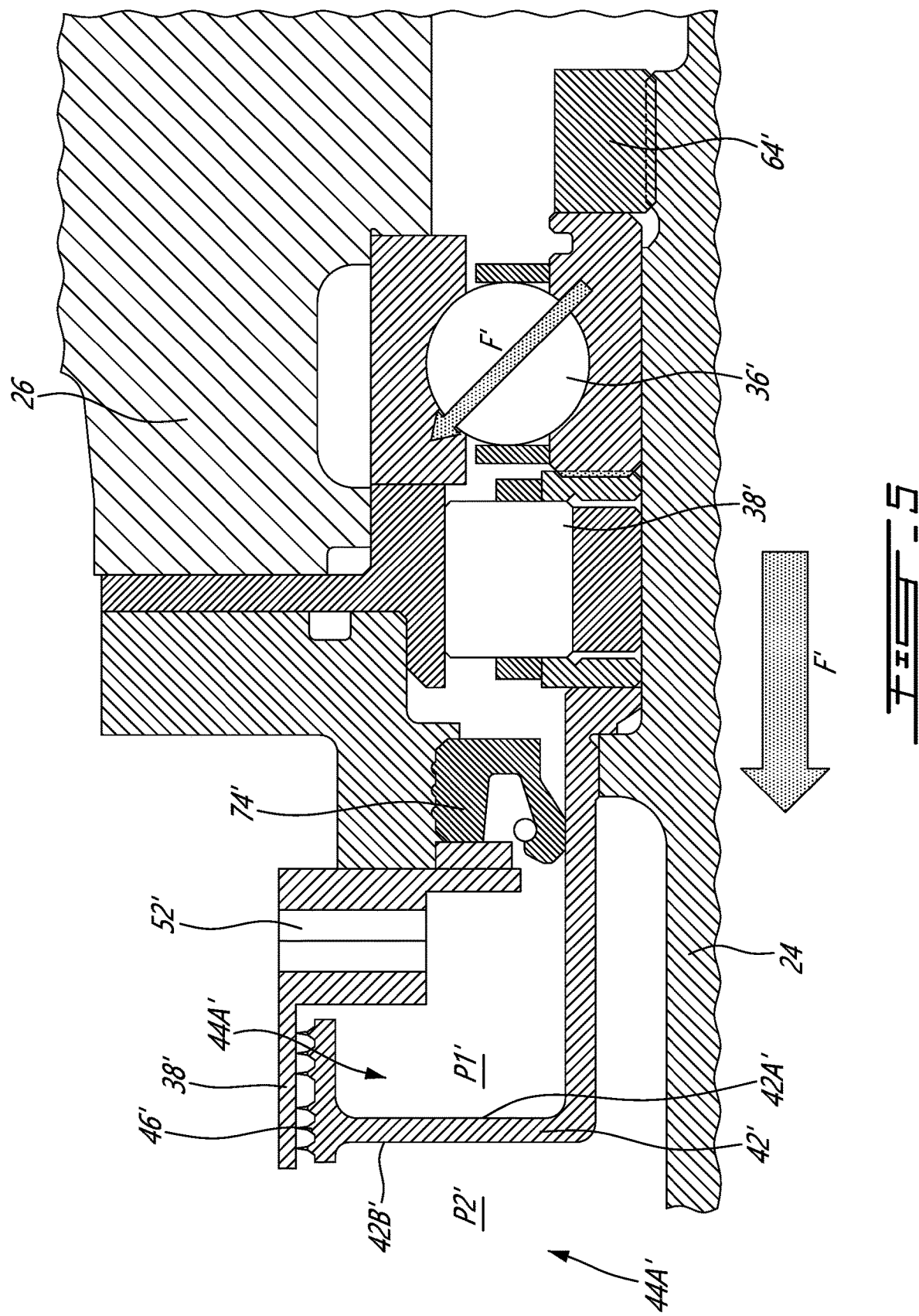

SYSTEM AND METHOD FOR PRELOADING A BEARING

TECHNICAL FIELD

The disclosure relates generally to aircraft engines and, more particularly, to preload thrusting of bearing assemblies in aircraft engines.

BACKGROUND

Reduction gearboxes of aircraft engines such as turboprop and turboshaft engines typically include ball bearing assemblies which support the various loads. The ball bearing assemblies also prevent axial movement of one or more shafts, and may thus be referred to as "thrust bearing assemblies". While thrust bearing assemblies are typically machined to tight tolerances, small amounts of play between the bearing balls and the bearing races within the housing may exist. This play may, for instance, cause noise and vibration of the engine when the engine is in operation. Much of this play can be eliminated by exerting a forward load on the bearings. While various systems exist for generating and exerting this forward load, improvements are desired.

SUMMARY

In one aspect, there is provided an aircraft engine, comprising: a rotating component; a reduction gearbox operatively connected to the rotating component; a rotating shaft extending along an engine axis and operatively coupled to the reduction gearbox; a thrust bearing disposed in a bearing housing extending around the rotating shaft, the rotating shaft supported by the bearing housing via the thrust bearing, the bearing housing defining a piston chamber; a piston axially secured to the rotating shaft, the piston in sealing engagement with the bearing housing inside the piston chamber, the piston dividing the piston chamber into a first cavity and a second cavity, the piston having a first axial face exposed to the first cavity and a second axial face opposite the first axial face and exposed to the second cavity, the first axial face facing axially away from the thrust bearing; and a source of compressed air in fluid communication with the first cavity via a compressed air inlet, the compressed air being at a first pressure exerting a first force against the first axial face, the second cavity being at a second pressure exerting a second force against the second axial face, the first force being greater than the second force.

In another aspect, there is provided a system for preloading a thrust bearing assembly in an aircraft engine, comprising: a shaft mounted for rotation about an axis; a thrust bearing disposed in a bearing housing, the thrust bearing operatively coupling the shaft to the bearing housing; a piston mounted to the shaft inside a piston chamber, the piston dividing the piston chamber into a first cavity and a second cavity, the piston having a first axial face facing the first cavity and a second axial face opposite the first axial face, the second axial face facing the second cavity and the thrust bearing; and a source of compressed air in fluid communication with the first cavity via a compressed air inlet, the compressed air being at a first pressure exerting a first force along the axis against the first axial face, the second cavity being at a second pressure exerting a second force against the second axial face, the first force being greater than the second force.

In a further aspect, there is provided a method for preloading a thrust bearing supporting a shaft in an aircraft engine, comprising: exerting an axial load on the shaft towards the thrust bearing by applying air pressure from a source of compressed air onto a working face of a pneumatic piston axially securely mounted to the shaft.

BRIEF DESCRIPTION OF THE DRAWINGS

Reference is now made to the accompanying figures in which:

FIG. 5 is a schematic cross sectional view of an axial preload system, according to one or more embodiments.

DETAILED DESCRIPTION

Figure 1:
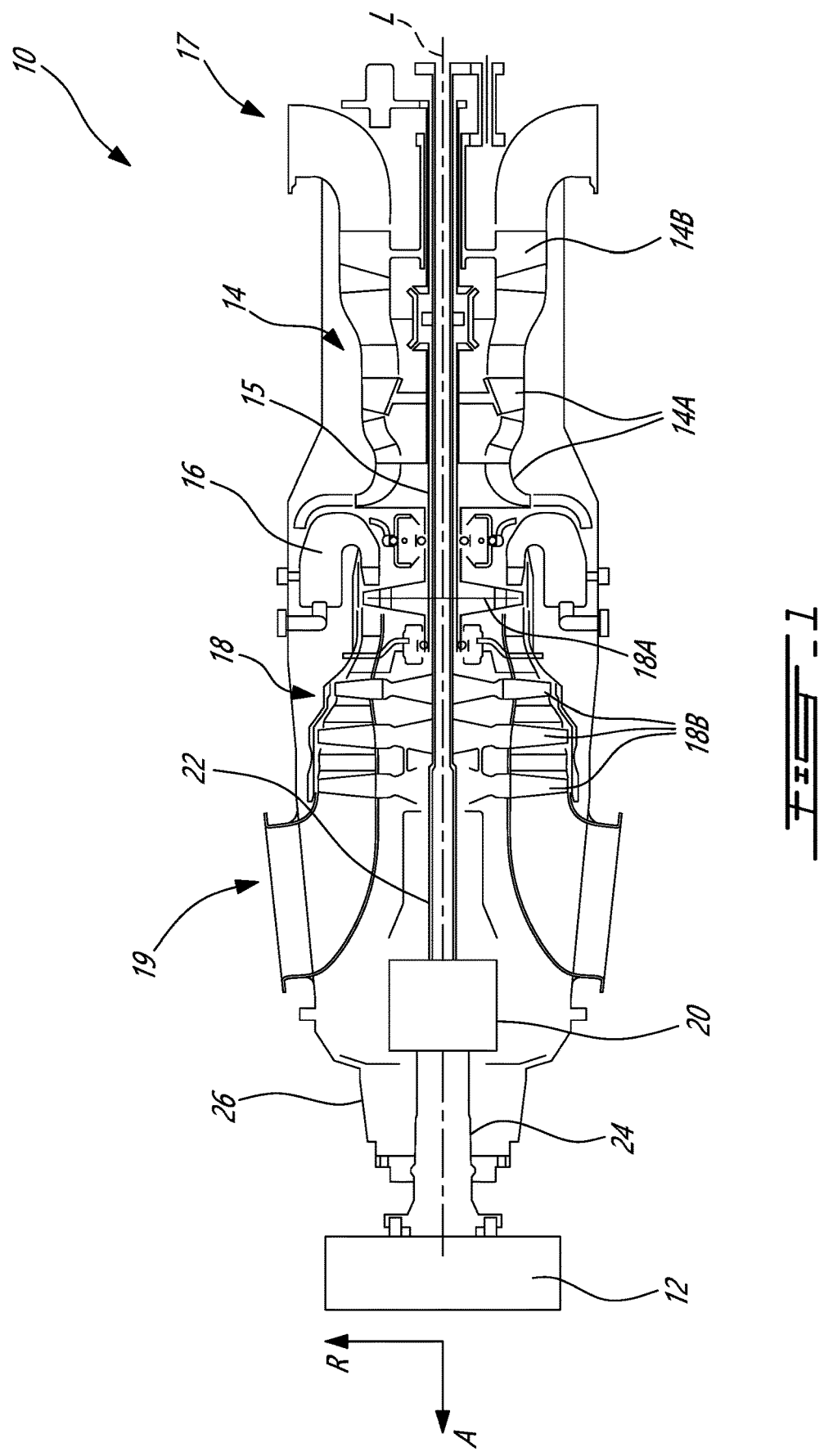
FIG. 1 is a schematic cross sectional view of a gas turbine engine.

FIG. 1 illustrates a gas turbine engine 10 of a type preferably provided for use in subsonic flight and configured for driving a rotating component 12, such as, but not limited to, a propeller or a helicopter rotor. Depending on the intended use, the engine 10 may be any suitable aircraft engine, and may be configured as a turbo propeller engine or a turboshaft engine. The gas turbine engine 10 generally comprises in serial flow communication a compressor section 14 for pressurizing the air, a combustor 16 in which the compressed air is mixed with fuel and ignited for generating an annular stream of hot combustion gases, and a turbine section 18 for extracting energy from the combustion gases.

The exemplary embodiment shown in FIG. 1 is a "reverse-flow" engine because gases flow from the inlet 17, at a rear portion of the engine 10, to the exhaust outlet 19, at a front portion of the engine 10. This is in contrast to "through-flow" gas turbine engines in which gases flow through the core of the engine from a front portion to a rear portion. The engine 10 may be a reverse-flow engine (as illustrated) or a through-flow engine.

In the illustrated embodiment, the turbine section 18 has a high-pressure turbine 18A in a driven engagement with a high-pressure compressor 14A. The high-pressure turbine 18A and the high-pressure compressor 14A are mounted on a high-pressure (HP) shaft 15. The turbine 18 has a low-pressure turbine, also known as power turbine 18B, configured to drive the rotating component 12. The power turbine 18B is configured to drive a low-pressure compressor 14b through a low pressure (LP) shaft 22. A reduction gearbox (RGB) 20 is configured to connect the LP shaft 22 that supports the power turbine 18B to a shaft 24 (also referred to an RGB output shaft) that drivingly engages the rotating component 12, while providing a reduction speed ratio therebetween.

The reduction gearbox 20 allows the rotating component 12 to be driven at a given speed, which is different than the rotational speed of the low-pressure turbine 18B. The reduction gearbox 20 allows both the rotating component 12 and the low-pressure turbine 18B to rotate at their respective optimal speeds which are different. In the embodiment shown, the reduction gearbox 20 is axially mounted at the front end of the engine 10 and is disposed within a housing 26 that circumferentially extends around a longitudinal axis L. The housing 26 is an external envelope of the turbo propeller engine 10. Accordingly, the rotation of the rotating component or propeller 12 creates an airflow around the housing 26 to create thrust. The housing 26 is thus wetted by air of an environment of the engine 10, i.e., ambient air. In a particular embodiment, the propeller 12 comprises from two to eight blades equidistantly separated from one another. The length of each blade of the propeller 12 may be substantially greater than a greatest radius of the housing 26—for example, at least double the size. The shaft 24 is used to support the rotating component 12, which generates a load on the shaft 24. The load has a radial component R and an axial component A relative to the axis L. The radial and axial components R and A of the load are the consequence of the creation of thrust by the rotation of the rotating component 12.

Figure 2:
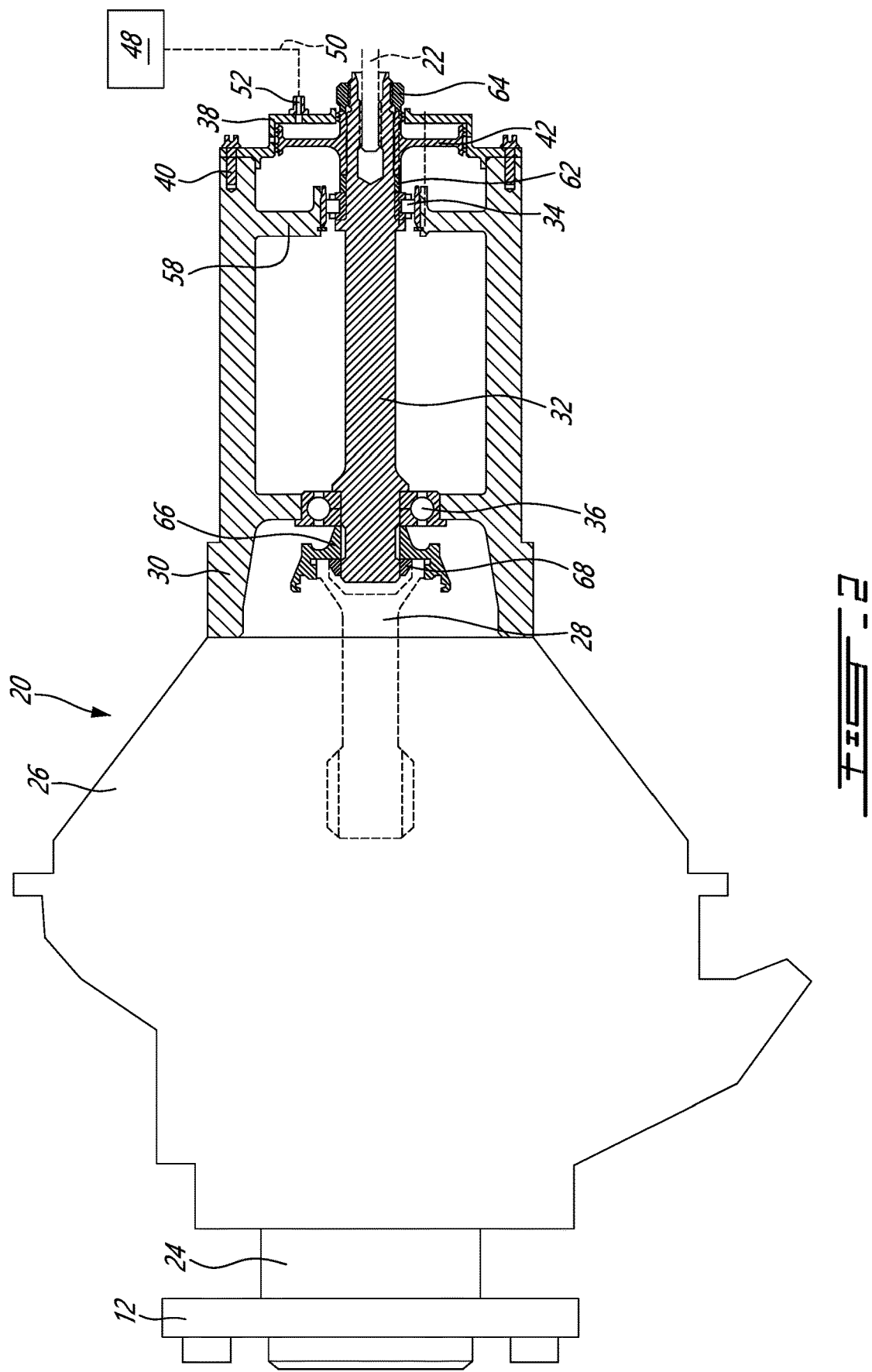
FIG. 2 is a schematic cross sectional view of a reduction gearbox assembly for the engine of FIG. 1.

Referring to FIG. 2, an exemplary reduction gearbox (RGB) 20 is shown, having an RGB input shaft 28 and the RGB output shaft 24. A bearing housing 30 housing a bearing shaft 32 is disposed adjacent the RGB 20, with the bearing shaft 32 rotatably coupling the RGB input shaft 28 to the LP shaft 22. A plurality of bearings, illustratively a roller bearing 34 and a ball bearing 36 operatively couple the bearing shaft 32 to the bearing housing 30, provide support thereto. Additional bearings may be provided between the RGB 20 and the rotating component 12, as will be discussed in further detail below. A cover 38 is provided at the junction of the bearing shaft 32 and the LP shaft 22, the cover 38 surrounding the bearing shaft 32 and operatively coupling the bearing housing 30 to the bearing shaft 32. One or more fasteners 40 may be provided for fastening the cover 38 to the bearing housing 30. The ball bearing 36 and its associated components may herein be referred to as a ball bearing assembly.

The ball bearing 36, also referred to as a thrust bearing, requires loading in an axial direction towards the RGB 20, for instance to prevent axial movement of the various shafts. As any amount of play between the bearing balls and the bearing races within the housing may exist, potentially causing issues such as noise and vibration of the engine 10, it may be desirable to preload the ball bearing 36. As such, a system for preloading a ball bearing assembly may include a piston 42, also referred to as an air piston or a pneumatic piston, mounted to the bearing shaft 32 for rotation therewith and configured for exerting an axial preload, through the bearing shaft, against the ball bearing 36. While the figures of the present disclosure depict a ball bearing 36 being preloaded by piston 42, it is understood the present disclosure is also applicable to other thrust bearings disposed in a bearing housing and extending about a rotating shaft in an aircraft engine.

Figure 3:
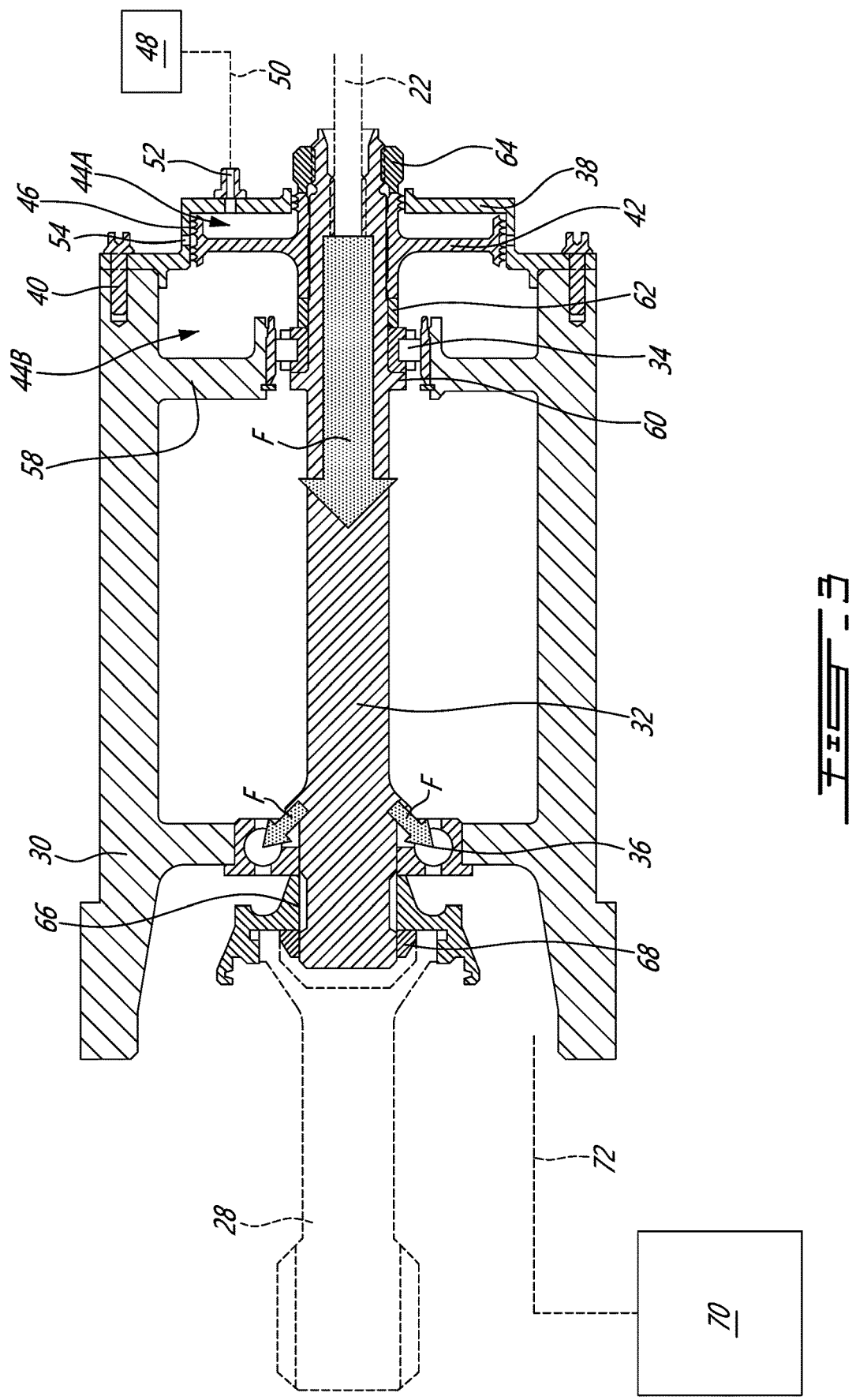
FIG. 3 is a schematic cross sectional view of an axial preload system, according to one or more embodiments.
Figure 4:
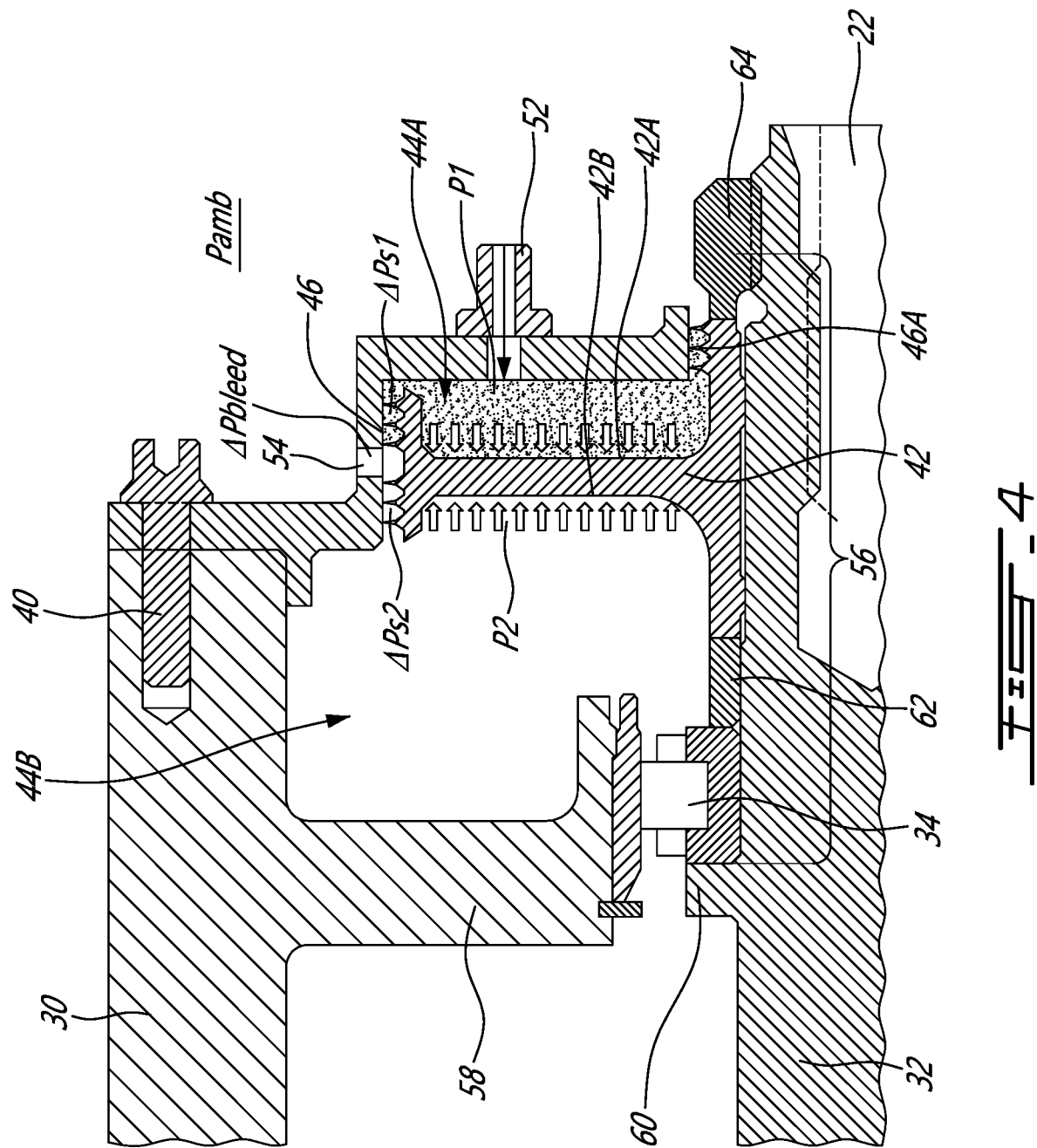
FIG. 4 is an enhanced schematic cross sectional view of the axial preload system of FIG. 3.

Referring additionally to FIGS. 3-4, the shown piston 42 is mounted to the bearing shaft 32, disposed radially within the cover 38, adjacent the junction between the bearing shaft 32 and the LP shaft 22. Other locations for the piston 42 may be contemplated, as will be discussed in further detail below. The piston 42 is axially secured to the bearing shaft 32 and in sealing engagement with the bearing housing 30 inside a piston chamber defined by the bearing housing 30. The piston 42 divides the piston chamber into a first cavity 44A and a second cavity 44B. The shown piston 42 has a first axial face 42A exposed to the first cavity 44A, and a second axial face 42B opposite the first axial face 42A and exposed to the second cavity 44B. The second cavity 44B is axially disposed between the ball bearing 36 and the piston 42. The second cavity 44B may extend between the second axial face 42B and the ball bearing 36. The piston 42 extends radially towards the cover 38, with a sealing element 46 disposed between the piston 42 and the cover 38. The sealing element 46 at least partially creates a seal between the first cavity 44A. Another sealing element 46A is illustratively provided between the cover 38 and the piston 42 at a radially inner end thereof. In the shown case, the sealing elements 46, 46A are labyrinth seals, although other sealing elements such as a brush seal, a carbon seal, an abrasive seal, or a plain seal may be contemplated. In the shown embodiments, the sealing elements 46, 46A includes fins disposed on the outer radius or inner radius, respectively, of the piston 42 and/or on the inner radius of the cover 38, with a seal clearance created therebetween.

A source of compressed air 48 is fluidly coupled to the first cavity 44A, illustratively via conduit 50 and inlet 52. In some embodiments, the source of compressed air 48 may be one of the compressors 14A, 14B (via bleed valves), although other sources may be contemplated. The compressed air may be at a first pressure P1 within the first cavity 44A, and thus exert a first force against the first axial face 42A. The magnitude of the force may be controlled, for instance, by modulating the delivery of compressed air via inlet 52 (e.g., via a metering device upstream of the inlet 52), or by varying the degree of sealing provided by the sealing elements 46. 46A. In addition, the area of the first and second axial faces 42A, 42B may vary to vary the forces applied thereto, as these forces are a function of the pressure in the cavities 44A, 44B and the area of the first and second axial faces 42A, 42B. Indeed, compressed air may selectively flow from the first cavity 44A to the second cavity 44B via sealing element 46. As such, air within the second cavity 44B at a second pressure P2 may exert a second force against the second piston face 42B, i.e., in a direction opposite the first force. The first force may be greater in magnitude than the second force, causing the piston 42 to exert an axial force F, via the bearing shaft 32, against the ball bearing 36, thereby preloading the ball bearing 36. In the shown embodiment, the axial force F is represented by a "pushing" force towards the ball bearing 36.

As discussed above, in the shown case, the sealing element 46, 46A include fins disposed on the outer radius of the piston 42 and/or on the inner radius of the cover 38, with a seal clearance created therebetween. A leakage flow of pressurized air from the first cavity 44A to the second cavity 44B may thus be formed. This leakage flow may be used to create the necessary pressure differential between pressures P1, P2 to exert the desired axial force F along the bearing shaft 32. The number of fins, the geometry of the fins, and the magnitude of the seal clearance may vary to modulate the leakage flow. In some embodiments, one or more bleed holes 54 may be provided within or adjacent the seal clearance to further assist in modulating the pressure differential, with compressed air being bled to the ambient environment (at an ambient pressure Pamb) surrounding the bearing housing 30. In the shown case, the sealing element 46 includes two sets of fins, with an intermediate cavity disposed therebetween. A bleed hole 54 is disposed between the two sets of fins. As such, a leakage flow of pressurized air may flow from the first cavity 44A, through the sets of fins, to the second cavity 44B, to create a pressure differential for applying the force F on the piston 42. As the pressure of air flowing across the sealing element 46 is greater than the Pamb, some air may flow out of the bleed hole 54 to further create the required pressure differential.

As discussed above, a pressure differential between the two cavities 44A, 44B may cause an overall preload force F acting against the piston 42 and, through the shaft 32, against the ball bearing 36. In the shown case, this pressure differential may be represented by the following equation:

$$P2 = P1 - \Delta Ps1 - \Delta Pbleed - \Delta Ps2$$

With ΔPs1 being a pressure drop through the first set of fins, ΔPbleed being a pressure drop by way of bleed hole 54, and ΔPs2 being a pressure drop through the second set of fins. In addition, the resulting force acting against the first axial face 42A may be determined by multiplying the pressure P1 by a surface area of the first axial face 42A, while the resulting force acting against the second axial face 42B may be determined by multiplying the pressure P2 by a surface area of the second axial face 42B. The force F thus acting against the piston 42, and thus against the ball bearing 36, may be determined by subtracting the force acting against the second axial face 42B from the force acting against the first axial face 42A, with the force acting against the first axial face 42A being of greater magnitude than the force acting against the second axial face 42B. The preload force F being exerted on the ball bearing 36 may thus be said to be a function of the pressure P1 in the first cavity 44A and the drops in pressure through the sealing element 46 (ΔPs1, ΔPs2, as well as bleed pressure differential ΔPbleed).

FIGS. 2-4 show an exemplary clamped stack 56 also referred to as a stackup, along the bearing shaft 32 at the piston 42. The roller bearing 34, radially supporting the bearing housing 30 via bearing support 58, is disposed against a shoulder 60 of the bearing shaft 32. A spacer 62 mounted to the bearing shaft 32 is disposed axially between and abuts the roller bearing 34 and the piston 42. A retaining nut 64 is mounted to the bearing shaft 32, axially adjacent to and abutting the piston 42, for retaining the bearing shaft 32 to the LP shaft 22. Other stackup arrangements may be contemplated. In the shown case, a splined coupling 66 and a retaining nut 68 operatively couple the bearing shaft 32 to the RGB input shaft 28, although other arrangements may be contemplated.

In some embodiments, the second cavity 44B may be at least partially filled with oil and may be fluidly coupled to an oil tank 70, illustratively via conduit 72. The air pressure P2 in the oil tank may exceed a pressure inside the oil tank 70. As such, oil may be directed from the second cavity 44B towards the oil tank 70 via conduit 72. In an exemplary embodiment, one or more oil nozzles may be provided within the bearing housing 30, for instance directed towards the bearings 34, 36. Oil may then collect or pool at a bottom of the bearing housing 30 before being directed towards the oil tank 70.

Referring to FIG. 5, another embodiment of a system for preloading a ball bearing assembly is shown. Unless otherwise stated, like reference numbers refer to like elements, with apostrophes added to distinguish between locations relative to the RGB 20. Whereas the embodiment shown in FIGS. 2-4 depicts a ball bearing assembly axially disposed between the RGB 20 and LP shaft 22, the embodiment shown in FIG. 5 depicts a ball bearing assembly mounted to the RGB output shaft 24 and axially disposed between the RGB 20 and the rotating component 12. As in the previous embodiment, compressed air from a compressed air source is introduced into the first cavity 44A' to exert a first force against the first axial face 42A'. The second piston face 42B', with pressure P2' exerting a second force against the second piston face 42B' in a direction opposite the first force, may be disposed in a second cavity 44B' exposed to ambient conditions (i.e., an open cavity) due to its location relative to the rotating component 12. Sealing element 46' at least partially seals the first cavity 44A' from the ambient conditions in which the second piston face 42B' is located, while another sealing element, illustratively a plain seal 74', creates a seal between the first cavity 44A' and the bearings 36', 38'. In this embodiment, the pressure differential on opposing sides of the piston 42' exerts an overall axial force F', through the shaft 24, to preload the ball bearing 36', illustratively in a "pulling" direction.

In accordance with the present disclosure, there is taught a system for preloading a ball bearing assembly by way of a pneumatic piston exerting a preload force against a shaft. Advantageously, compressed air may be introduced to the cavities surrounding the piston before the engine is fully operational, thereby allowing the ball bearings to already be sufficiently preloaded before the various shafts begin rotating, which may allow for more precise axial preloading and an extended lifespan for the ball bearings. It is understood that a system for preloading a ball bearing assembly according to the present disclosure may include one or more ball bearing assemblies, for instance disposed on one or more sides of the RGB 20, requiring preloading.

According to the present disclosure, there is taught an exemplary method for preloading a ball bearing mounted to a shaft in an aircraft engine. An axial load is exerted on the shaft towards the thrust bearing by applying air pressure from a source of compressed air onto a working face of a pneumatic piston axially securely mounted to the shaft.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
    a rotating component;
    a reduction gearbox operatively connected to the rotating component;
    a rotating shaft extending along an engine axis and operatively coupled to the reduction gearbox;
    a thrust bearing disposed in a bearing housing extending around the rotating shaft, the rotating shaft supported by the bearing housing via the thrust bearing, the bearing housing defining a piston chamber;
    a piston axially secured to the rotating shaft, the piston in sealing engagement with the bearing housing inside the piston chamber, the piston dividing the piston chamber into a first cavity and a second cavity, the piston having a first axial face exposed to the first cavity and a second axial face opposite the first axial face and exposed to the second cavity, the first axial face facing axially away from the thrust bearing; and
    a source of compressed air in fluid communication with the first cavity via a compressed air inlet, the compressed air being at a first pressure exerting a first force against the first axial face, the second cavity being at a second pressure exerting a second force against the second axial face, the first force being greater than the second force;
    wherein the bearing housing comprises a cover, and wherein the aircraft engine further comprise a sealing element between the cover and the piston, and a bleed hole defined in the cover and fluidly coupled to the sealing element, the bleed hole configured for bleeding at least some of the compressed air from the first cavity.

2. The aircraft engine as defined in claim 1, further comprising a spacer mounted to the shaft and a roller bearing mounted to the shaft adjacent a shaft shoulder, the spacer axially disposed and maintaining a stackup between the piston and the roller bearing, the piston axially clamped between the spacer and a retaining nut threadedly engaged on the shaft.

3. The aircraft engine as defined in claim 1, wherein the sealing element is one or more of a labyrinth seal, a brush seal, a carbon seal, an abrasive seal, and a plain seal.

4. The aircraft engine as defined in claim 1, further comprising a low pressure spool having a low pressure shaft rotatably coupled to the rotating shaft, and a reduction gearbox input shaft rotatably coupling the rotating shaft to the reduction gearbox, the rotating shaft axially disposed between the low pressure shaft and the reduction gearbox input shaft.

5. The aircraft engine as defined in claim 1, wherein the rotating shaft is axially disposed between the reduction gearbox and the rotating component.

6. The aircraft engine as defined in claim 1, further comprising an oil tank fluidly coupled to the second cavity, the second pressure being higher than a pressure in the oil tank to direct oil in the second cavity towards the oil tank.

7. The aircraft engine as defined in claim 1, wherein the source of compressed air includes a bleed port of a compressor of the aircraft engine.

8. A system for preloading a thrust bearing assembly in an aircraft engine, comprising:
    a shaft mounted for rotation about an axis;
    a thrust bearing disposed in a bearing housing, the thrust bearing operatively coupling the shaft to the bearing housing;
    a piston mounted to the shaft inside a piston chamber, the piston dividing the piston chamber into a first cavity and a second cavity, the piston having a first axial face facing the first cavity and a second axial face opposite the first axial face, the second axial face facing the second cavity and the thrust bearing;
    a source of compressed air in fluid communication with the first cavity via a compressed air inlet, the compressed air being at a first pressure exerting a first force along the axis against the first axial face, the second cavity being at a second pressure exerting a second force against the second axial face, the first force being greater than the second force; and
    a spacer mounted to the shaft and a roller bearing mounted to the shaft adjacent a shaft shoulder, the spacer axially disposed and maintaining a stackup between the piston and the roller bearing, the piston axially clamped between the spacer and a retaining nut threadedly engaged on the shaft.

9. The system as defined in claim 8, wherein the bearing housing has a cover surrounding the piston, and wherein the system further comprises a sealing element between the piston and the cover, the sealing element providing sealing between the first cavity and the second cavity of the piston chamber, and a bleed hole defined in the cover, the bleed hole fluidly coupled to the sealing element and bleeding at least some of the compressed air from the first cavity.

10. The system as defined in claim 9, wherein the sealing element is one or more of a labyrinth seal, a brush seal, a carbon seal, an abrasive seal, and a plain seal.

11. The system as defined in claim 9, wherein the sealing element is a labyrinth seal having two sets of fins with an intermediate cavity disposed therebetween, the bleed hole disposed between the two sets of fins and fluidly connected to the intermediate cavity.

12. The system as defined in claim 8, wherein the thrust bearing is a ball bearing.

13. The system as defined in claim 8, wherein the second cavity is fluidly connectable to an oil tank of the aircraft engine, the second pressure being higher than a pressure in the oil tank to direct oil in the second cavity towards the oil tank.

14. The system as defined in claim 8, wherein the source of compressed air is a bleed port of a compressor of the aircraft engine.

15. A system for preloading a thrust bearing assembly in an aircraft engine, comprising:
 a shaft mounted for rotation about an axis;
 a thrust bearing disposed in a bearing housing, the thrust bearing operatively coupling the shaft to the bearing housing;
 a piston mounted to the shaft inside a piston chamber, the piston dividing the piston chamber into a first cavity and a second cavity, the piston having a first axial face facing the first cavity and a second axial face opposite the first axial face, the second axial face facing the second cavity and the thrust bearing; and
 a source of compressed air in fluid communication with the first cavity via a compressed air inlet, the compressed air being at a first pressure exerting a first force along the axis against the first axial face, the second cavity being at a second pressure exerting a second force against the second axial face, the first force being greater than the second force,
 wherein the second cavity is fluidly coupled to an oil tank, the second pressure being higher than a pressure in the oil tank to direct oil in the second cavity towards the oil tank.

16. An aircraft engine, comprising:
 a rotating component;
 a reduction gearbox operatively connected to the rotating component;
 a rotating shaft extending along an engine axis and operatively coupled to the reduction gearbox;
 a thrust bearing disposed in a bearing housing extending around the rotating shaft, the rotating shaft supported by the bearing housing via the thrust bearing, the bearing housing defining a piston chamber;
 a piston axially secured to the rotating shaft, the piston in sealing engagement with the bearing housing inside the piston chamber, the piston dividing the piston chamber into a first cavity and a second cavity, the piston having a first axial face exposed to the first cavity and a second axial face opposite the first axial face and exposed to the second cavity, the first axial face facing axially away from the thrust bearing;
 a source of compressed air in fluid communication with the first cavity via a compressed air inlet, the compressed air being at a first pressure exerting a first force against the first axial face, the second cavity being at a second pressure exerting a second force against the second axial face, the first force being greater than the second force; and
 a low pressure spool having a low pressure shaft rotatably coupled to the rotating shaft, and a reduction gearbox input shaft rotatably coupling the rotating shaft to the reduction gearbox, the rotating shaft axially disposed between the low pressure shaft and the reduction gearbox input shaft.

* * * * *